J. E. JOHNSON.
AUTOMOBILE TIRE ENLARGER.
APPLICATION FILED OCT. 24, 1916.
1,311,971.
Patented Aug. 5, 1919.
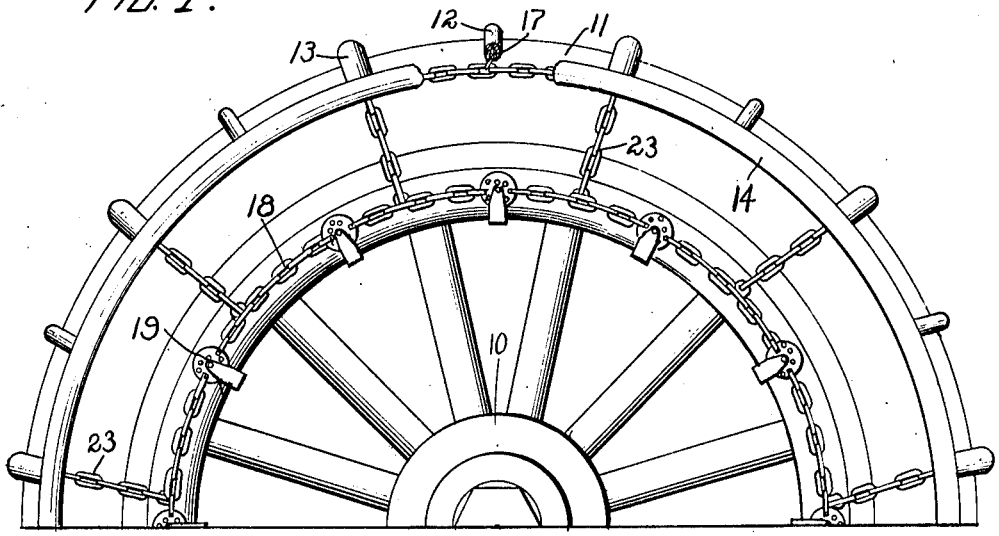
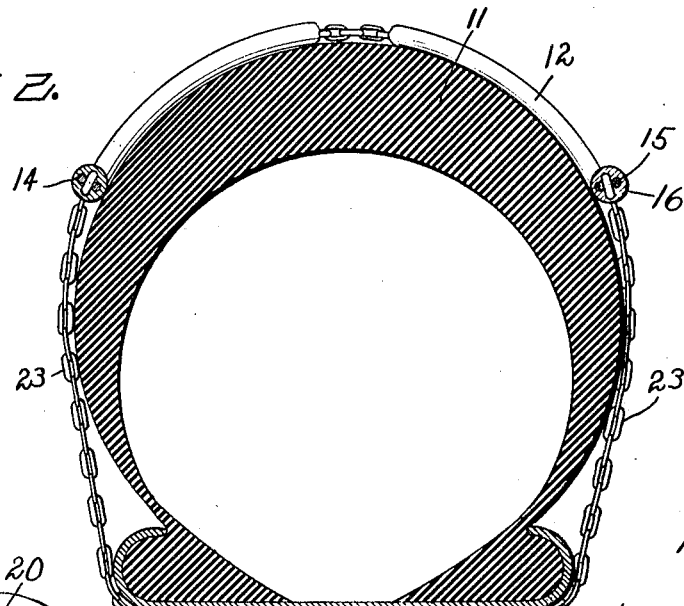
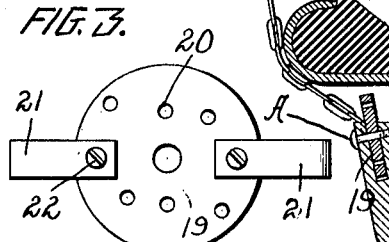
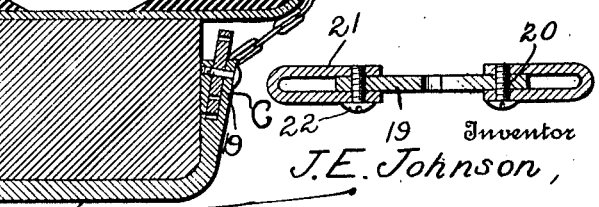
Inventor
J. E. Johnson,

UNITED STATES PATENT OFFICE.

JOHN ELMER JOHNSON, OF RUTH, NEVADA.

AUTOMOBILE-TIRE ENLARGER.

1,311,971.  Specification of Letters Patent.  Patented Aug. 5, 1919.

Application filed October 24, 1916. Serial No. 127,454.

*To all whom it may concern:*

Be it known that I, JOHN ELMER JOHNSON, a citizen of the United States of America, and resident of Ruth, in the county of White Pine and State of Nevada, have invented certain new and useful Improvements in Automobile-Tire Enlargers, of which the following is a specification.

This invention relates to automobile tires and particularly to means for increasing the diameters of cases of automobile tires and in furthermore providing against slipping or skidding of the tire, certain forms of the invention being in effect anti-skid devices which are detachably applied to the wheels and tires of automobiles and the like.

An object of this invention is to provide an attachment for automobile wheels in which the road engaging or contacting elements are effective to increase the size of the tire or the circumference thereof in effect at least, since the said invention will prove effective to increase the distance traveled at each rotation of the wheel.

Furthermore, an object of this invention is to provide a tire attachment having novel means by which the tension of the tire holding means is increased or diminished so that it can be applied to tires of different sizes within predetermined bounds and held thereon by reason of the ability to shorten or lengthen the tire retaining cord or chain.

A still further object of this invention is to provide a novel casing in which the tread surface is increased as compared with tires now in common use especially where an inner pneumatic tube is employed in conjunction with the said casing or tire.

A still further object of this invention is to provide a shoe capable of use in connection with pneumatic tubes and in which the tread surface is increased as compared with pneumatic tires now in common use and in one embodiment of the invention, the tread surface is normally concaved so that when the tire is rotated and it contacts with the roadbed it has a tendency to flatten and engage the roadbed with an increased area as compared with the area of the tire in its normal or concaved state.

A still further object of this invention is to provide a shoe for a casing of a pneumatic tire, the said shoe embracing the tire casing as well as the felly between the spokes, said shoe being secured by fastening means, such as lacings or the like.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a fragment of a vehicle wheel showing a tire with the invention applied thereto;

Fig. 2 illustrates a sectional view thereof;

Fig. 3 illustrates a detail view of a chain tightening device;

Fig. 4 illustrates a sectional view thereof.

In these drawings 10 denotes a fragment of a wheel, 11 a tire to which a tire enlarger is applied, the said tire enlarger consisting of two series of transversely disposed road-bed engaging members 12 and 13 and two circumferential flexible members 14 and 15 here shown as comprising chains incased or encircled by a sheathing such as 16 and this sheathing may be leather, rubber or any other material appropriate for such use. The transversely disposed members 12 and 13 are likewise provided with casings or covers such as 17 in the present embodiment of the invention.

The retaining chains 18 (but one of which is shown in elevation in Fig. 1) comprise a series of sections of chains with interposed chain tightening members comprising disks 19 having apertures 20 so that the links of the chain 18 may be secured in the apertures in such a way as to increase or diminish the length of the retaining chain. Referring for instance to the showing in Fig. 3, it is apparent that if one link such as 21 had its pin or connecting member 22 in one of the apertures 20 closer to the center of the disk, there will be a shortening of the chain and, therefore, the adjustment provided is quite material if several of these disks are utilized and interposed between the sections of chain which are employed for holding the attachment on the wheel. The circumferential flexible members 14 and 15 have connections 23 and extending from them, and the said connections are attached to the chain 18 for exerting a pull laterally.

The disks are rotatably mounted on pivots A here shown in the form of screws and the said screws are threaded in clamps B which embrace the felly. The edges of the clamps have slots C in which the disks are rotatable so that the adjustment can be attained for shortening or lengthening the chain.

I claim—

In a chain tightening device for use on tires, a member having apertures in different positions with relation to the periphery of said member, links adapted to be connected to the said apertures so that the anchorage thereof is nearer to or farther from the said periphery to shorten or lengthen a chain, members extending through the links and through the apertures of the member for attaching the said links to the said member, said member having a central aperture and an anchoring device extending therethrough on which the said member is rotatable.

JOHN ELMER JOHNSON.